(No Model.)

T. S. VALENTINE, Sr.
CORN CUTTER.

No. 493,135.  Patented Mar. 7, 1893.

Witnesses:
R. C. Paul
J. J. Miller

Inventor:
Theodore S. Valentine Sr
By G. C. Thompson
Attorney

UNITED STATES PATENT OFFICE.

THEODORE S. VALENTINE, SR., OF CUMBERLAND, MARYLAND.

CORN-CUTTER.

SPECIFICATION forming part of Letters Patent No. 493,135, dated March 7, 1893.

Application filed April 6, 1892. Serial No. 428,096. (No model.)

*To all whom it may concern:*

Be it known that I, THEODORE S. VALENTINE, Sr., a citizen of the United States, residing at Cumberland, in the county of Allegany and State of Maryland, have invented a new and useful Corn-Cutting Machine, of which the following is a specification.

My newly invented machine is for the purpose of cutting corn while in the field when harvesting the same and the object of the invention is to facilitate this labor. I accomplish these results in a machine which is drawn by horse power and which is constructed in the following manner reference being had to the accompanying drawings which are illustrations of the same.

Figure 1:
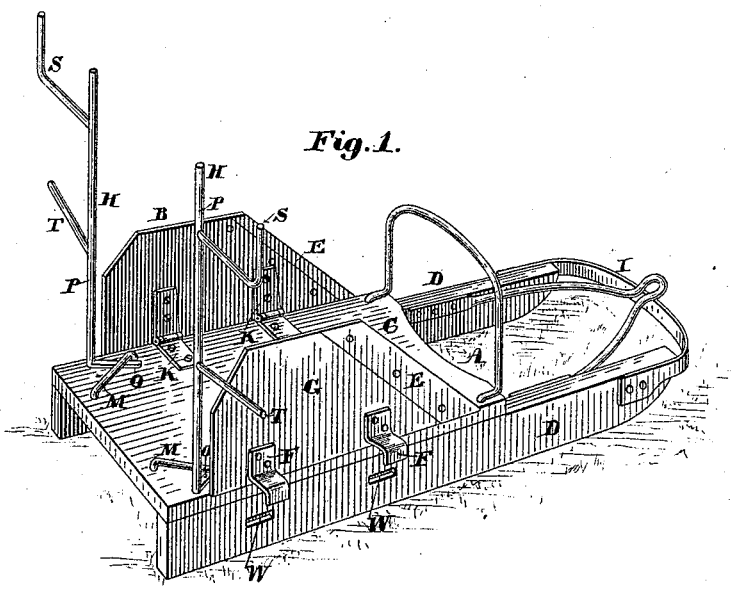
Figures 2, 3:
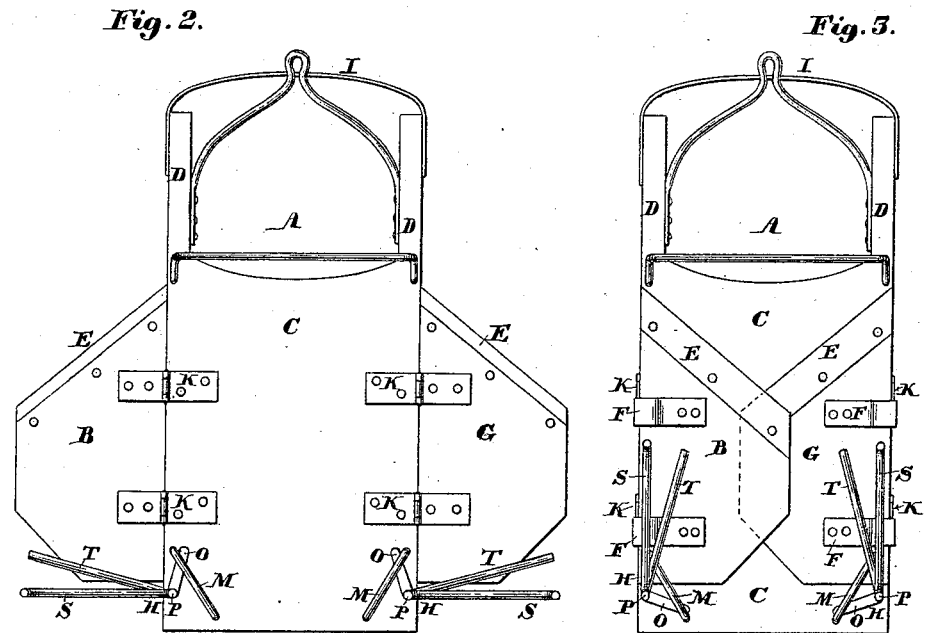

Figure 1 represents in perspective a top and side view of the entire machine. Fig. 2, a top view of the machine showing the position of the wings and racks when the machine is in operation. Fig. 3 a top view of the machine representing the wings and racks folded.

The main parts of the machine consist of the drag A and the wings B. G. The drag A is composed of the bed C and runners D and is made conveniently narrow to pass between the rows of standing corn. The wings B. G. which move on hinges K K upon either side of the bed C project beyond the sides of the drag (Fig. 2) when in a working position their top sides being upon a plane with the top of the bed and they are held from falling below this position by the support heels F. F. which are placed upon each wing. on the under side as shown in Fig. 1. upon the elevated wing G. the free ends of the heels resting in the notches W. W. of the runners. The front edge of each wing slopes backward from the side of the drag and each bears a knife E which is secured to the edge. The edges of the knives are thus made to stand obliquely to the sides of the drag when in operation a position which enables them to perform their work more perfectly. The racks H H one upon each side at the rear end of the bed C are each composed of a stem P and the prongs S and T. and a foot prong O. the lower end of the stem of each being pivoted to the bed C just back of the wings. By this means they can be swung so that the prongs S and T. in each are behind the wings where they serve as a support for the corn when it is placed against them. The prong T is at an angle to the prong S. in each rack, and when the racks are in this position the prongs T are forward of the prongs S for the purpose of supporting the stalks near the middle to keep them from sagging. The foot prong O in each rack rests upon the bed C and vibrates under the keepers $m$ $m$. By this means the racks are more firmly supported in a vertical position and are also prevented from swinging backward beyond the position in which they are needed to support the corn placed against them.

When in operation the drag is drawn between the rows with the wings (Fig. 2.) extended so that each knife meets and cuts the row upon the side it is carried as the machine progresses. When the corn is thus cut a workman for each row standing upon the bed of the drag places it against the racks and at convenient distances apart places it in shocks. The iron bow I which passes in front of the runners from one to the other prevents them from colliding with the stalks.

When the machine is not in use the wings can be folded over the top of the bed C (Fig. 3) thus permitting it to be taken through narrow passages and securing those handling it from the danger of the knives.

What I claim is—

In combination with a corn cutting machine consisting of the drag A. wings B G. bearing knives E E. the swinging racks H H each composed of a stem P. prongs S. T and O the stem P of each rack being pivoted to said drag A one upon each side upon the rear end as and for the purpose set forth.

THEODORE S. VALENTINE, SR.

Witnesses:
 DANIEL J. COAKLEY,
 PATRICK MILLS.